(12) United States Patent
Morin et al.

(10) Patent No.: US 6,584,312 B1
(45) Date of Patent: Jun. 24, 2003

(54) ADAPTIVE SUBSCRIBER SERVICE ALLOCATION

(75) Inventors: Stephane Morin, Pierrefonds (CA); Steven Rochefort, Pointe Claire (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/144,760

(22) Filed: Aug. 31, 1998

(51) Int. Cl.[7] .................................................. H04Q 7/20
(52) U.S. Cl. ...................................... 455/433; 455/440
(58) Field of Search ................................ 455/414, 466, 455/440, 433; 380/248; 342/457

(56) References Cited

U.S. PATENT DOCUMENTS

| | | | | |
|---|---|---|---|---|
| 5,241,598 A | * | 8/1993 | Raith | 380/248 |
| 5,485,163 A | * | 1/1996 | Singer et al. | 342/457 |
| 5,812,950 A | * | 9/1998 | Tom | 455/440 |
| 5,946,630 A | * | 8/1999 | Willars et al. | 455/466 |
| 6,226,516 B1 | * | 5/2001 | Gupta et al. | 455/433 |

FOREIGN PATENT DOCUMENTS

| | | |
|---|---|---|
| EP | 0 685 972 | 4/1995 |
| GB | 2 304 497 | 3/1997 |
| WO | WO 97/20441 | 6/1997 |
| WO | WO 98/59503 | 12/1998 |

OTHER PUBLICATIONS

Delory & Treillard, "Security and Saturation Solutions for GSM", Telephone Engineer and Management, Jan. 15, 1991.*
Weib 7 Wizgall, "System 900: The ISDN Approach to Cellular Mobile Radio", Electrical Comunication, vol. 63, No. 4 1989.*
Ballard, Issenmann, & Sanchez, "Cellular Mobile Radio as an Intelligent Network Application", Electrical Comunication, vol. 63, No. 4 1989.*
PCT International Search Report, Dec. 21, 1999, PCT/SE 99/01334.

* cited by examiner

*Primary Examiner*—William Cumming
(74) *Attorney, Agent, or Firm*—Jenkens & Gilchrist; Sandra Beauchesne

(57) ABSTRACT

A system, method, and apparatus for providing subscriber services to a mobile terminal are provided. The mobile switching centers (MSCs) transmit an MSC capabilities message which informs the Home Location Register (HLR) of the services the MSC supports. When a mobile terminal roams to a particular MSC, the HLR compares the subscriber profile and the MSC capabilities message to determine whether the MSC can support a particular subscriber service. Where the MSC cannot support a particular subscriber service, the HLR determines a comparable service which the MSC does support and modifies a copy of the subscriber profile to include the comparable service as a replacement for the subscriber service that is not supported.

8 Claims, 4 Drawing Sheets

ADAPTIVE SUBSCRIBER SERVICE ALLOCATION

BACKGROUND OF THE INVENTION

1. Technical Field of the Invention

The present invention relates generally to the provision of subscriber services in a wireless network, and more particularly to a procedure for adapting subscripted to subscriber services for provision throughout the wireless network.

2. Description of Related Art

Subscribers to a wireless network are able to utilize numerous optional subscriber services in addition to their basic wireless telephone service. Subscriber services allow subscribers to customize their wireless telephone service in accordance with their own usage habits and preferences. Examples of such subscriber services include call waiting, call forwarding, voice mail, three-way calling, and caller identification (CallerID).

The provision of subscriber services often requires the presence of special software and hardware at the switch, such as a Mobile Switching Center (MSC), serving the subscriber during a call. Ideally, each MSC in a wireless network is capable from a software and hardware perspective of supporting the same homogenous set of subscriber services. However, MSC service capabilities can and do vary for several reasons. For example, MSCs are often made by different manufacturers with manufacturers trying to distinguish their MSC from other MSCs by supporting special innovative services that are not identical to the services of other manufacturers. Furthermore, MSCs made by different manufacturers may implement the same subscriber services in a different manner causing formatting and compatibility discrepancies between MSCs. Still further, MSCs may not be correspondingly upgraded throughout the network to support the same subscriber services in identical fashion. Accordingly, an MSC might not support or may be incompatible with a particular subscriber service selected by the subscriber.

A design goal of wireless networks is to allow the subscriber to move throughout the network, while receiving the same services. In order to accomplish this goal, MSCs are placed throughout the wireless network area, with each MSC serving a particular area within the wireless network area. When a subscriber moves throughout the wireless network area, the subscriber may be served by different MSCs. As the subscriber moves, there is a chance that a subscriber may not be able to use a particular subscriber service at a particular MSC because of the differences in the subscriber service support capabilities of the MSCs.

A record known as a subscriber profile is associated with each subscriber and contains information regarding each of the subscriber services that the subscriber has selected. This subscriber profile is stored in a database called a home location register. When a mobile station enters the area served by the MSC, the MSC downloads the subscriber profile for the subscriber from the home location register and examines the subscriber services that may need to be provided to the subscriber. Matching between the subscriber services and the services supported by the MSC involves comparing specific technical settings. Any discrepancy in the comparison results in a denial of the particular subscriber service. Furthermore, subscriber services which are not supported by the MSC are also denied.

In many cases, the noted discrepancy occurs because of partial differences between the subscribed service and the corresponding or analogous service supported by the MSC. For example, a subscriber profile might indicate access to a certain service for both incoming and outgoing calls, while the serving MSC is only capable of supporting that service for outgoing calls. Despite the fact that the subscriber could have been provided with partial subscriber service by the MSC, the entire subscriber service will be denied.

Accordingly, what is desired is a more flexible manner of permitting a subscriber access to subscriber services.

SUMMARY OF THE INVENTION

The present invention is directed to a system, method, and apparatus for providing subscriber services for a mobile subscriber who has moved to a particular mobile switching center (MSC). A determination is made as to whether a particular subscriber service is supported by the MSC. Where the subscriber service is not supported, a comparable service that is supported by the MSC is identified and provided to the subscriber. Provision of the comparable service is effectuated by modifying a copy of the subscriber profile to include the comparable service as a replacement for the subscriber service that is not supported.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
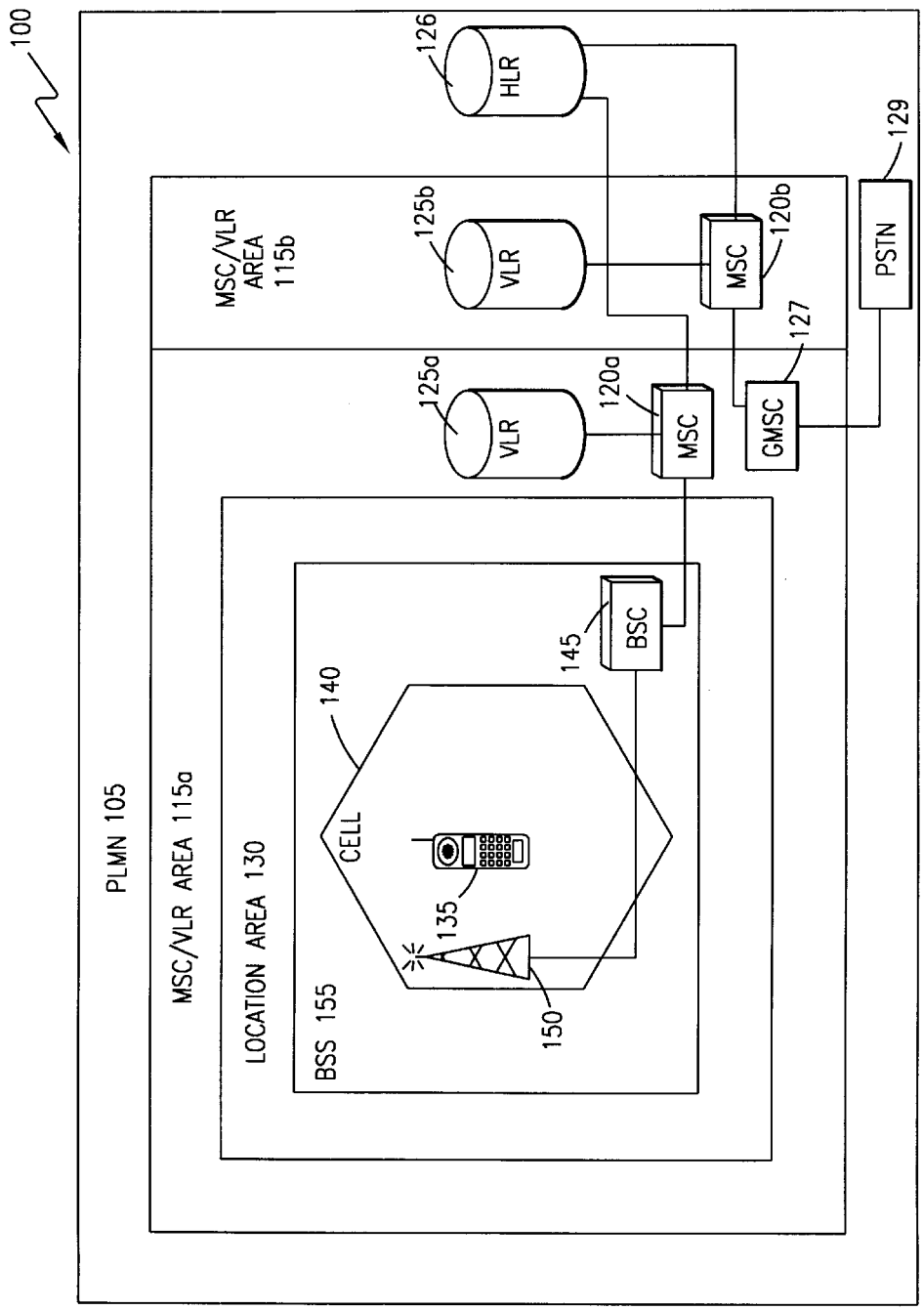
FIG. 1 is an exemplary wireless network within which the principles of the present invention may be supplemented.

Reference is now made to FIG. 1 wherein there is shown an exemplary wireless network 100, such as a Public Land Mobile Network (PLMN) 105. The PLMN 105 may comprise, for example, an Advanced Mobile Phone Service (AMPS) network, a Digital Advanced Mobile Phone Service (D-AMPS) network, or a Global System for Mobile Communication (GSM). The PLMN 105 is composed of a plurality of Mobile Switching Center/Visitor Location Register (MSC/VLR) areas 115, each with a Mobile Switching Center (MSC) 120 and an integrated Visitor Location Register (VLR) 125 therein. Each MSC 120 is connected to a Gateway MSC 127 which connects the PLMN 105 to a public switched telephone network (PSTN) 129.

The MSC/VLR areas 115, in turn, include a plurality of Location Areas (LA) 130, which are defined as that part of a given MSC/VLR area 115 in which a mobile station (MS) (terminal) 135 may move freely without having to send update location information to the MSC/VLR area 115 that controls the LA 130. Mobile Station (MS) 135 is the physical equipment, for example a car phone or other portable phone, used by mobile subscribers to communicate with the cellular network 105, each other, and users outside the subscribed network, both wireline and wireless. Each Location Area 130 is divided into a number of cells 140. The MSC 120 is in communication with at least one Base Station 150. The base station 150 is the physical equipment, illustrated for simplicity as a radio tower, that provides radio coverage to the geographical part of the cell 140 for which it is responsible.

With further reference to FIG. 1, the PLMN 105 includes a Home Location Register (HLR) 126, which is a database maintaining and storing subscriber information such as subscriber profiles, current location information, International Mobile Subscriber Identity (IMSI) numbers, and other administrative information. The subscriber services associated with the mobile station 135 are defined in a subscriber profile that is stored in the HLR 126. The HLR 126 may be co-located with a given MSC 120, integrated with the MSC 120, or alternatively can service multiple MSCs 120, the latter of which is illustrated in FIG. 1.

The VLR 125 is a database containing information about all of the Mobile Stations 135 currently located within the MSC/VLR area 115. If a MS 135 moves from MSC/VLR area 115a to a new MSC/VLR area 115b, the VLR 125b connected to the MSC 120b in the new MSC/VLR area will request data about that Mobile Station 135 from the HLR database 126 (simultaneously informing the HLR 126 about the current location of the MS 135). Accordingly, if the user of the MS 135 then wants to make a call, the VLR 125b in the new MSC/VLR area 115 has access to the requisite service profile information without having to reinterrogate the HLR 126. In the previously described manner, the VLR and HLR databases 125 and 126, respectively, contain various subscriber information associated with a given MS 135.

In order for the serving MSC 120b to communicate information to other nodes of the PLMN 105 concerning the subscriber services it supports, a master list is used throughout the network 100 containing each possible MSC service that is available at any MSC 120 in the network. The master list can be dynamically updated as new services are released to the network 100. The serving MSC 120b communicates its service capabilities using an MSC capabilities message to other HLR nodes by referring to the supported services contained in the master list. Later, when the mobile station 135 moves from one MSC/VLR area 115a to another MSC/VLR area 115b, the HLR uses the MSC capabilities message to adapt a copy of the subscriber profile in the manner described herein to best match the subscriber's desired services and the serving MSC's 120b service capabilities.

Figure 2A:
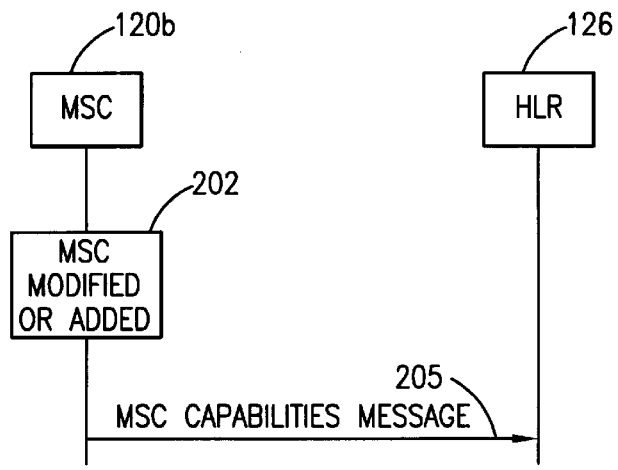
FIG. 2A is a signal flow diagram illustrating the operation of the Mobile Switching Center (MSC) and the Home Location Register (HLR) when an MSC is modified or added.
Figure 2B:
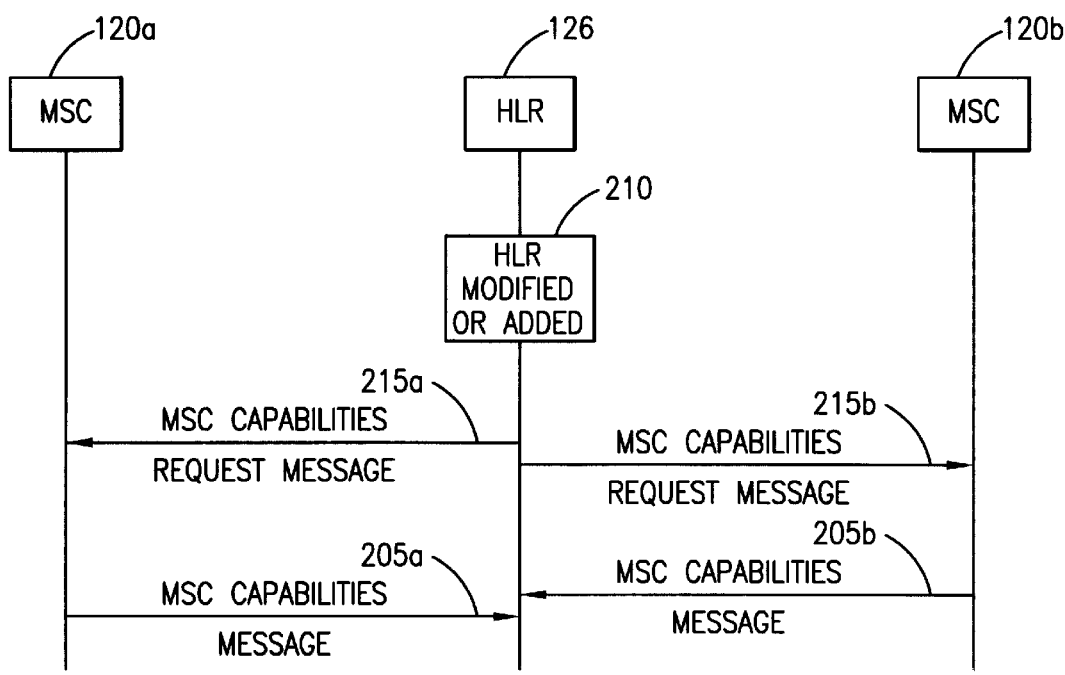
FIG. 2B is a signal flow diagram illustrating the operation of the MSC and the HLR when the HLR is modified or added.

Reference is now made to FIGS. 2A and 2B, wherein there is shown a signal flow diagram illustrating the transmission of the MSC capabilities message. In order for HLR 126 to modify a copy of the subscriber profile to best match the service capabilities of the serving MSC 120b, the HLR must first know the capabilities of the MSC. The HLR 126 is informed of the capabilities of the serving MSC 120b by the information contained in an MSC capabilities message communicated from the serving MSC 120b to the HLR 126. The MSC capabilities message comprises the requisite information describing the services which the MSC 120b supports.

Referring now to FIG. 2A, there is shown a signal flow diagram illustrating the transmission of an MSC capabilities message when the MSC 120b is modified or added into the network. At step 202, an MSC 12 Db is either modified or added into the network, requiring the HLR 126 to be informed of the set of services supported by the MSC 120b. For example, when the MSC 120b is first installed in a network, the MSC capabilities need to be communicated to the HLR for later access and use. If the services supported by the MSC 120b are subsequently modified, the MSC capabilities stored in the HLR 126 will need to be updated. In another scenario, when an MSC 120b in a pre-existing network is upgraded, it is advantageous for the MSC to be able to transmit its capabilities to the HLR 126. Conventional operation and maintenance (O&M) functionalities are used to recognize such an installation or MSC upgrade or modification. Responsive to a modification or addition of an MSC 120b (step 202), an MSC capabilities message 205 is transmitted from the MSC 120b to the HLR 126.

Referring now to FIG. 2B, there is shown a signal flow diagram illustrating the transmission of an MSC capabilities message in an alternative scenario, wherein the HLR 126 is modified or added into the network. At step 210, an HLR 126 is either upgraded or replaced with an HLR 126 with adaptive subscriber service allocation capabilities. In order to cause the MSCs 120a, 120b to communicate their MSC capabilities, the HLR 126 broadcasts an MSC capabilities request message 215a, 215b to each MSC in the network. It should be noted that while only two MSCs 120 are shown for purposes of clarity, any number of MSCs 120 can exist. When an MSC 120a, 120b receives the MSC capabilities request message 215a, 215b, the MSC responds by sending an MSC capabilities message 205.

Figure 3:
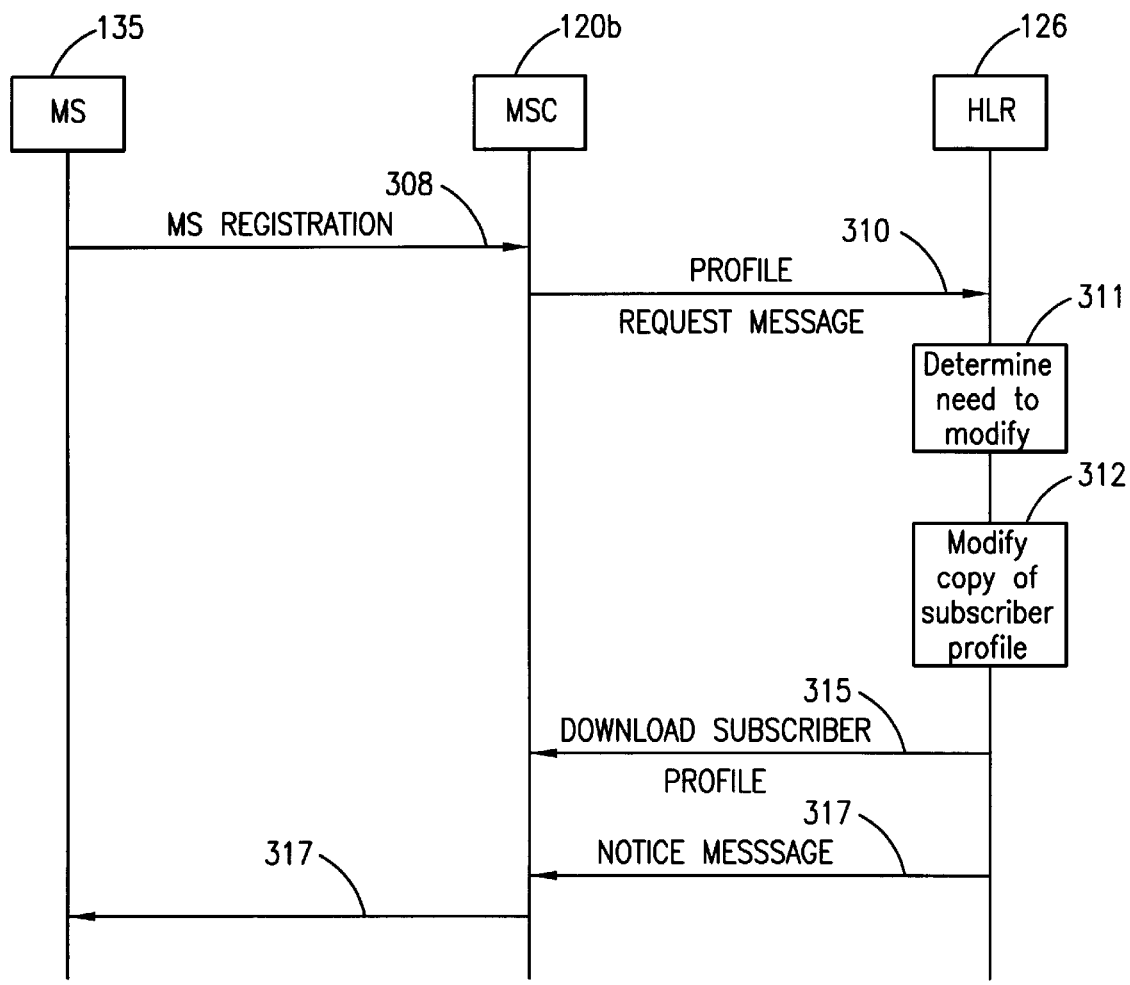
FIG. 3 is a signal flow diagram illustrating the operation of the Mobile Switching Center (MSC) and the Home Location Register (HLR) in accordance with the present invention.

When the HLR 126 receives the MSC capabilities message 205, either as shown in FIG. 2A or FIG. 2B, the HLR stores the MSC capabilities message for later use to modify a copy of the subscriber profile when the MS 135 associated with the subscriber moves from the first MSC 120a to MSC 120b. Reference is now made to FIG. 3, wherein there is shown a signal flow diagram for the exchange of information between the serving MSC 120b and the HLR 126 when adapting a copy of the subscriber profile. When the MS 135 moves from the first MSC 120a to the serving MSC 120b, an MS registration message 308 is sent to MSC 120b. The MSC 120b then sends a profile request message 310 requesting the HLR 126 to transmit the subscriber profile associated with the MS 135. It should be noted that transmission of the profile request message 310 can be responsive to other situations, such as changes in the subscriber profile in the HLR 126. Upon receipt of the profile request message 310, the HLR determines whether the subscriber profile needs to modified (step 311) by comparing the subscriber profile to the MSC capabilities message 205 transmitted by MSC 120b. If yes, a copy of the HLR stored subscriber profile is made and then modified to include a comparable or restricted service (step 312). When the HLR 126 finishes comparing and modifying the copy of the subscriber profile, the modified subscriber profile copy 315 is transmitted from the HLR 126 to the MSC 120b. It should be recognized that the subscriber profile as stored in the HLR 126 is not affected or changed when the modified subscriber profile copy is created in step 312. Furthermore, a message 317 is sent to the mobile station 135 from the HLR 126 informing the subscriber that his subscriber profile has been temporarily modified in order to provide the best possible services considering the restricted capabilities of the MSC 120. This message 317 may comprise either a voice message or a text message (using, perhaps, short message service (SMS) message delivery). The message 317 may also specify the exact manner with which the subscriber's service profile has been modified.

Figure 4:
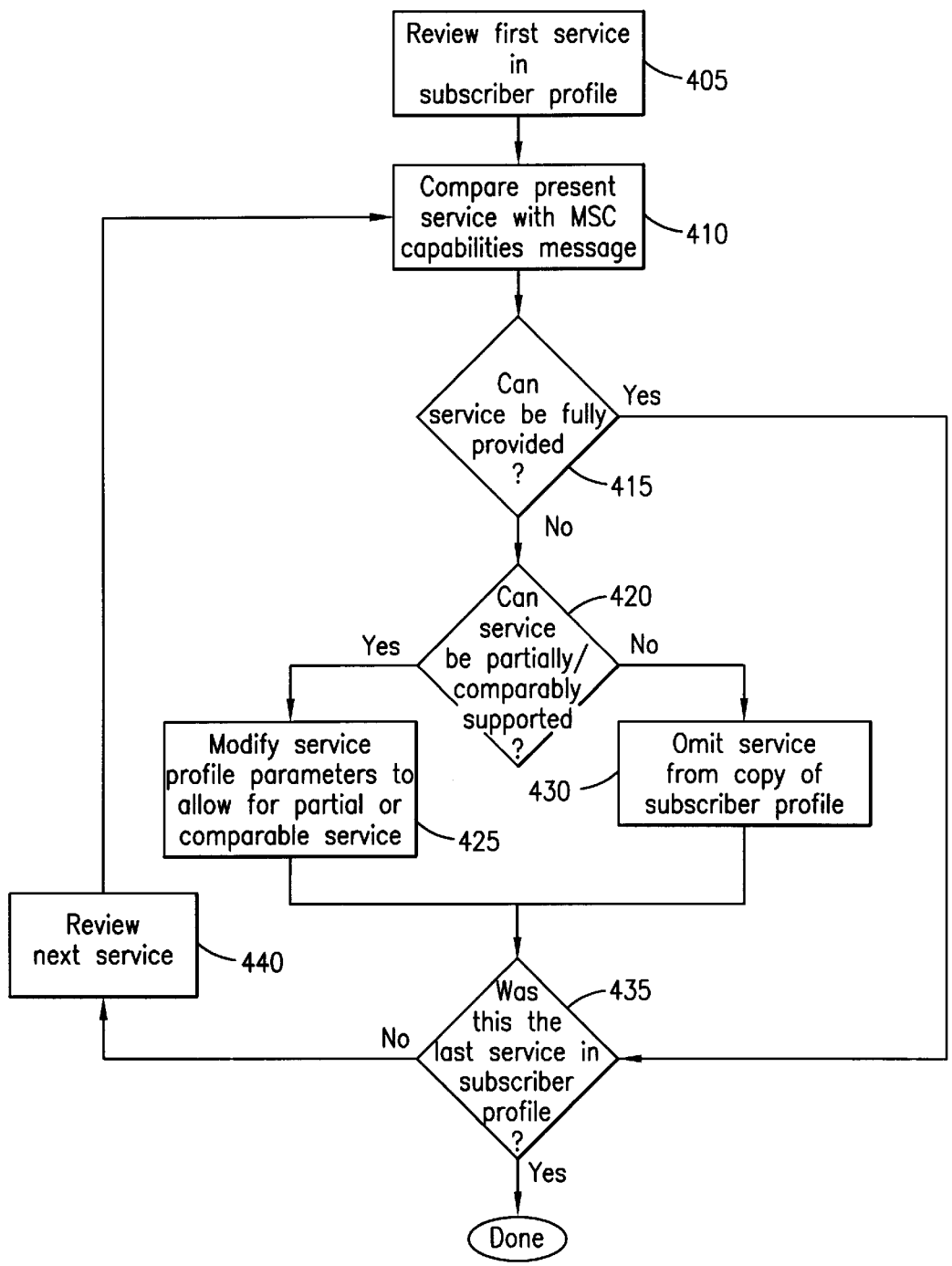
FIG. 4 is a flow chart illustrating the operation of the HLR in accordance with the present invention.

Reference is now made to FIG. 4 wherein there is shown a flow diagram illustrating the operation of the HLR 126 when comparing the supported services identified in the MSC capabilities message to the services contained within the subscriber profile and modifying the copy of the subscriber profile. This comparison operation is performed in order to determine if a copy of the subscriber profile needs to be modified in order to provide as complete as possible service support to a subscriber. The HLR begins by reviewing the first subscriber service stored in the subscriber profile (step 405). The subscriber service is then compared with the services supported by the MSC 120b as identified in the MSC capabilities message which describes (step 410). As stated above this comparison is based on the list of indices to the master list by the MSC capabilities message. After comparing the service with the capabilities identified in the MSC capabilities message, the HLR 126 determines whether the service can be fully provided by the MSC 120b (step 415).

If the service cannot be fully supported as determined in step 415, a copy of the subscriber profile is retrieved from the HLR 126 and modified. From the comparison at step 410, the HLR 126 determines whether the MSC 120b offers a substitute service, a comparable service, or can partially support the service (step 420). Where the MSC 120b offers a substitute service, a comparable service, or partially supports the service, the subscriber profile parameters in the retrieved copy are modified to identify the substitute, comparable, or partial service (step 425). On the other hand, if MSC 120b does not offer a comparable service and cannot partially support the service, the parameters pertaining to the service are omitted from the subscriber profile copy (step 430). Again, it should be recognized that the subscriber profile as stored in the HLR 126 is not affected or changed when the modified subscriber profile copy is created.

If at step 415 the HLR 126 determines that the service can be fully supported by the MSC 120b, steps 420 through 430 are bypassed and no changes are made to the parameters of the subscriber profile copy pertaining to the service.

After the service is compared with the MSC capabilities message and the modifications, if any, are made to the subscriber profile copy, the HLR determines whether the service was the last service in the subscriber profile (step 435). Where the service is not the last service in the subscriber profile, the HLR 126 reviews the next service in the subscriber profile (step 440) and steps 410 through 435 are repeated. Steps 410 through 440 are repeated for each service in the subscriber profile until the last service in the subscriber profile is encountered at step 435. When the HLR 126 finishes comparing and modifying the subscriber profile copy as illustrated in FIG. 4, the modified subscriber profile copy is transmitted from the HLR 126 to the MSC 120b. Again, it should be recognized that the subscriber profile as stored in the HLR 126 is not affected or changed when the modified subscriber profile copy is created. Furthermore, the HLR may at this point also provide the notice message (317, FIG. 3) indicating to the subscriber how the service profile has been temporarily changed to account for the service limitations of the MSC.

With further reference to FIGS. 1, 2, 3, and 4, the operation of the HLR 126 is described in the exemplary case where the subscriber associated with mobile station 135 subscribes to a first service, such as immediate call itemization (ICI) for both originating and terminating calls, and a second service, such as message waiting service according to enhanced ANSI-41D. Using message 205, the MSC 120b has previously informed the HLR 126 that it supports the first service, immediate call itemization, for outgoing calls only and the second service, message waiting, according to ANSI-41D. When the subscriber moves into MSC/VLR Area 115b and registers 308, the MSC 120b sends a profile request message 310 to the HLR 126. When the HLR 126 receives the profile request message 310, the HLR 126 compares the subscriber profile associated with the mobile station 135.

At step 405, the HLR 126 reviews the first service in the subscriber profile, for example immediate call itemization. At step 410, the HLR 126 compares the immediate call itemization service described in the subscriber profile with the MSC capabilities message. After making the comparison, the HLR 126 determines that the MSC 120b cannot fully support the immediate call itemization service described in the subscriber profile at step 415 because the subscriber is subscripted to incoming and outgoing service support and the MSC only supports the service for outgoing calls. At step 420, the HLR 126 determines that the MSC 120b can partially support the immediate call itemization service by offering immediate call itemization for outgoing calls only as a replacement service. At step 425, the HLR 126 modifies the subscriber profile parameters in the subscriber profile copy to conform to the immediate call itemization for outgoing calls only, as offered by the MSC 120b. For example, the HLR 126 may modify the subscriber profile copy to restrict the MS 135 to outgoing calls only. At step 435, the HLR 126 determines that the immediate call itemization service was not the last service in the subscriber profile, and reviews the next subscriber service, message waiting, at step 440.

At step 410, the HLR 126 compares the subscriber profile with the MSC capabilities message and at step 415, determines that the message waiting service according to the enhanced ANSI-41D cannot be fully supported. At step 420, the HLR 126 determines that the message waiting service according to the enhanced ANSI-41D is comparable to the message waiting service according to a ANSI-41D that is offered by the MSC 120b. At step 425, the HLR 126 modifies the subscriber profile copy to conform the message waiting service according to the ANSI-41D as a replacement service, and at step 435, the HLR 126 determines that the message waiting service is the last service in the subscriber profile. Again, it should be recognized that the subscriber profile as stored in the HLR 126 is not affected or changed when the modified subscriber profile copy is created.

The foregoing represents a more flexible way of providing access to subscriber services to subscribers who roam from one MSC/VLR area to another MSC/VLR area. Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a telecommunication system comprising a mobile switching center (MSC) connected to a home location register (HLR) storing subscriber profiles, a method for serving and providing subscriber services for a subscriber associated with a mobile station, said method comprising the steps of:

receiving by the HLR an MSC capabilities message transmitted from the MSC including a plurality of subscriber services that are supported by the MSC;

receiving a request for a subscriber profile associated with the mobile station from an MSC currently serving the mobile station to the HLR, said subscriber profile listing a certain subscriber service;

determining whether the MSC can support said certain subscriber service; and if the MSC currently serving the mobile station cannot support said certain subscriber service, modifying by the HLR of a copy of said subscriber profile to list at least one substitute subscriber service that is supported by the MSC as a replacement for said certain subscriber service.

2. The method of claim 1, wherein said determining step occurs at the HLR.

3. The method of claim 1, wherein said determining step further comprises the step of comparing the plurality of subscriber services identified in said MSC capabilities message to the certain subscriber service listed in the subscriber profile.

4. The method of claim 1, further including the step of downloading the modified copy of the subscriber profile to the MSC for use in serving and providing subscriber services to the subscriber.

5. A Home Location Register (HLR) connected to a mobile switching center (MSC) serving a mobile station, wherein said home location register stores a subscriber profile listing a certain subscriber service for that mobile station, said HLR comprising:

means for receiving by the HLR an MSC capabilities message transmitted from the MSC including a plurality of subscriber services that are supported by the MSC;

means for determining whether the serving MSC can support said certain subscriber service; and means responsive to failure to support the subscriber service for modifying a copy of said subscriber profile to list a substitute subscriber service that is supported by the serving MSC as a replacement service for said certain subscriber service.

6. The HLR of claim 5, wherein the HLR stores a listing subscriber services supported by each MSC.

7. The HLR of claim 6 wherein said means for determining further comprises means for comparing the supported subscriber services to the subscriber service listed in said subscriber profile.

8. The HLR of claim 5 further including means for downloading the modified copy of said subscriber profile to the MSC for use in serving and providing subscriber services to the mobile station.

* * * * *

UNITED STATES PATENT AND TRADEMARK OFFICE
CERTIFICATE OF CORRECTION

PATENT NO. : 6,584,312 B1 Page 1 of 1
APPLICATION NO. : 09/144760
DATED : June 24, 2003
INVENTOR(S) : Morin et al.

It is certified that error appears in the above-identified patent and that said Letters Patent is hereby corrected as shown below:

In Column 4, Line 1, delete "12 Db" and insert -- 120b --, therefor.

In Column 8, Line 15, in Claim 6, after "listing" insert -- of --.

In Column 8, Line 18, in Claim 7, after "the" insert -- MSC --.

In Column 8, Line 19, in Claim 7, after "to the" insert -- certain --.

Signed and Sealed this

Twenty-ninth Day of December, 2009

David J. Kappos
*Director of the United States Patent and Trademark Office*